United States Patent
Wada

(10) Patent No.: US 7,200,089 B2
(45) Date of Patent: Apr. 3, 2007

(54) DISK REPRODUCING DEVICE REPRODUCING INFORMATION RECORDED ON RECORDING MEDIUM BY MULTIPLE RECORDING DEVICES

(75) Inventor: Kozo Wada, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 604 days.

(21) Appl. No.: 10/654,506

(22) Filed: Sep. 3, 2003

(65) Prior Publication Data

US 2004/0042366 A1    Mar. 4, 2004

(30) Foreign Application Priority Data

Sep. 4, 2002   (JP) ............................. 2002-258655

(51) Int. Cl.
*G11B 7/00* (2006.01)
(52) U.S. Cl. ................................. 369/53.35; 369/59.17
(58) Field of Classification Search ............. 369/59.17, 369/53.35

See application file for complete search history.

(56) References Cited

U.S. PATENT DOCUMENTS 5,661,709 A * 8/1997 Takagi et al. ............. 369/59.22
6,477,125 B1 * 11/2002 Hayami .................... 369/59.22
6,721,254 B1 * 4/2004 Yamaguchi ............... 369/53.35

FOREIGN PATENT DOCUMENTS

| JP | 7-334867 | 12/1995 |
| JP | 9-171663 | 6/1997 |
| JP | 9-306005 | 11/1997 |
| JP | 2000-123490 | 4/2000 |
| JP | 2000-276848 | 10/2000 |
| JP | 2001-266495 | 9/2001 |
| JP | 2001-344911 | 12/2001 |
| JP | 2002-245635 | 8/2002 |

OTHER PUBLICATIONS

Notice of Ground of Rejection dated Oct. 18, 2005 with English Translation (5 pages).
Patent Abstracts of Japan; Publication No. 2001-266495 dated Sep. 28, 2001 (1 page).

(Continued)

*Primary Examiner*—William Korzuch
*Assistant Examiner*—Adam R. Giesy
(74) *Attorney, Agent, or Firm*—Osha Liang LLP

(57) ABSTRACT

A disk is placed into a disk drive device to be held therein. Then, a laser pickup is moved to the inner edge of the disk in step S1, various servos are automatically adjusted in step S2, TOC information of the disk is read in step S3, and a DBAL adjustment is performed in step S4. Here, the DBAL adjustment refers to an adjustment of a balance of a slice value for data. It is then determined whether or not the disk is recorded with information in multisession in step S5. If the disk is recorded in multisession, the DBAL adjustment for the session proceeds to a DBAL adjustment for a subsequent session in step S7. In other words, if the disk is a multisession disk, the DBAL adjustment is performed for each session.

8 Claims, 9 Drawing Sheets

OTHER PUBLICATIONS

Patent Abstracts of Japan; Publication No. 2000-123490 dated Apr. 28, 2000 (1 page).

Patent Abstracts of Japan; Publication No. 09-171663 dated Jun. 30, 1997 (1 page).

Patent Abstracts of Japan; Publication No. 2002-245635 dated Aug. 30, 2002 (1 page).

Patent Abstracts of Japan; Publication No. 07-334867 dated Dec. 22, 1995 (1 page).

Patent Abstracts of Japan Publication No.: 09-306005, published Nov. 28, 1997 (1 page).

Patent Abstracts of Japan Publication No.: 2001-344911, published Dec. 14, 2001 (2 pages).

Patent Abstracts of Japan Publication No.: 2000-276848, published Oct. 6, 2000 (1page).

* cited by examiner

DISK REPRODUCING DEVICE REPRODUCING INFORMATION RECORDED ON RECORDING MEDIUM BY MULTIPLE RECORDING DEVICES

BACKGROUND OF THE INVENTION

1. Field of the Invention

The present invention relates to a disk reproducing device which reproduces signals recorded on such a disk as optical disk. In particular, the present invention relates to a disk reproducing device appropriate for reproduction of signals recorded on one disk written by means of a plurality of writing devices.

2. Description of the Background Art

There has been a technique of making a recording, on a disk on which multisession recording is possible, in sessions respectively by a plurality of recording devices.

Two techniques are disclosed, for example, concerning reproduction of a disk which has been recorded by means of a plurality of recording devices. One is disclosed in Japanese Patent Laying-Open No. 9-306005, according to which characteristics of a servo circuit of a reproducing device are self-adjusted for each of regions of the disk that are recorded respectively by different recording methods. The other is disclosed in Japanese Patent Laying-Open No. 2001-344911 according to which data are recorded on the same recording medium in accordance with a plurality of reproduction specifications and reproduction information is further recorded on the recording medium in order to reproduce the data in accordance with respective reproduction specifications.

The above-described conventional techniques, however, do not consider error correction for the disk or unsatisfactory in terms of the error correction. Concerning error correction, Japanese Patent Laying-Open No. 2000-276848 for example discloses a technique of error correction by which errors are corrected by changing an equalizing factor depending on whether a reproduction signal has asymmetry or not.

Japanese Patent Laying-Open No. 2000-276848 discloses a technique of reproducing data by PRML (Partial Response Maximum Likelihood) which is a reproduction system of digital data and is a combination of the partial response system and the maximum likelihood decoding system using the Viterbi decoding system. Specifically, with reference to FIG. 9, an optical disk is irradiated with laser light, accordingly digital data recorded on the optical disk medium is read as an analog reproduction signal and the reproduction signal is amplified by a preamplifier circuit 104. Then, the amplified analog signal is shaped by a waveform shaping circuit 105 having functions of a low-pass filter (LPF) and an equalizer (EQ) conducting waveform shaping, and converted into a digital signal by an analog/digital (A/D) converting circuit 106. The digitized reproduction signal is further equalized to a waveform of partial response characteristics (PR characteristics) that is set in advance by an equalizer 111. An output signal from equalizer 111 is Viterbi-decoded by a maximum likelihood decoding circuit 120 so as to reproduce the digital data recorded on the optical disk.

The reproduction system shown in FIG. 9, however, requires the read analog signal, to be converted into digital data and processed by equalizer 111 and maximum likelihood decoding circuit 120.

There has always been a need for simplification of the disk reproducing device.

SUMMARY OF THE INVENTION

The present invention has been made in consideration of the above-described circumstances. An object of the present invention is to simplify a disk reproducing device which reproduces information recorded on a recording medium by a plurality of recording devices, while improving an error rate.

A disk reproducing device according to an aspect of the present invention includes a high-frequency emphasis filter to which a disk reproduction signal is input, a binarizing unit connected to the high-frequency emphasis filter and binarizing the disk reproduction signal, an error detecting unit connected to the binarizing unit and detecting an error in the binarized disk reproduction signal, a threshold adjusting unit connected to the error detecting unit and the binarizing unit and adjusting a threshold used for the binarization by the binarizing unit, a determining unit determining whether or not a disk to be reproduced is recorded with information in multisession, and a control unit correcting the threshold adjusted by the threshold adjusting unit based on the degree of asymmetry of the disk reproduction signal. If the determining unit determines that the disk to be reproduced is recorded with information in multisession, the binarizing unit, the error detecting unit, the threshold adjusting unit and the control unit operate for each session of the disk to be reproduced.

A disk reproducing device according to another aspect of the present invention includes a high-frequency emphasis filter to which a disk reproduction signal is input, a binarizing unit connected to the high-frequency emphasis filter and binarizing the disk reproduction signal, an error detecting unit connected to the binarizing unit and detecting an error in the binarized disk reproduction signal, a threshold adjusting unit connected to the error detecting unit and the binarizing unit and adjusting a threshold used for the binarization by the binarizing unit, and a control unit correcting the threshold adjusted by the threshold adjusting unit based on the degree of asymmetry of the disk reproduction signal. The binarizing unit, the error detecting unit, the threshold adjusting unit and the control unit operate for each session of the disk to be reproduced.

According to the present invention, for each session of the disk, the disk reproduction signal is passed through the high-frequency emphasis filter and the binarizing unit and thus binarized, any error in the signal is detected, and the slice level which is a threshold used by the binarizing unit is adjusted so as to decrease the error rate. In this way, the slice level is adjusted for each session of the disk to be reproduced and thereby the error rate is reduced. It is accordingly possible for the disk reproducing device to improve the error rate of a disk to be reproduced, even if the disk is a multisession disk having information written by a plurality of writing devices, and thus can reproduce recorded data in an optimum state. Moreover, the disk reproducing device of the present invention corrects the threshold used by the binarizing unit, according to the degree of asymmetry, so that PR (Partial Response) equalizing and most likelihood decoding are unnecessary. The device can thus be simplified.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A disk drive device is hereinafter described that is an embodiment of a disk reproducing device according to the present invention.

Figure 1:
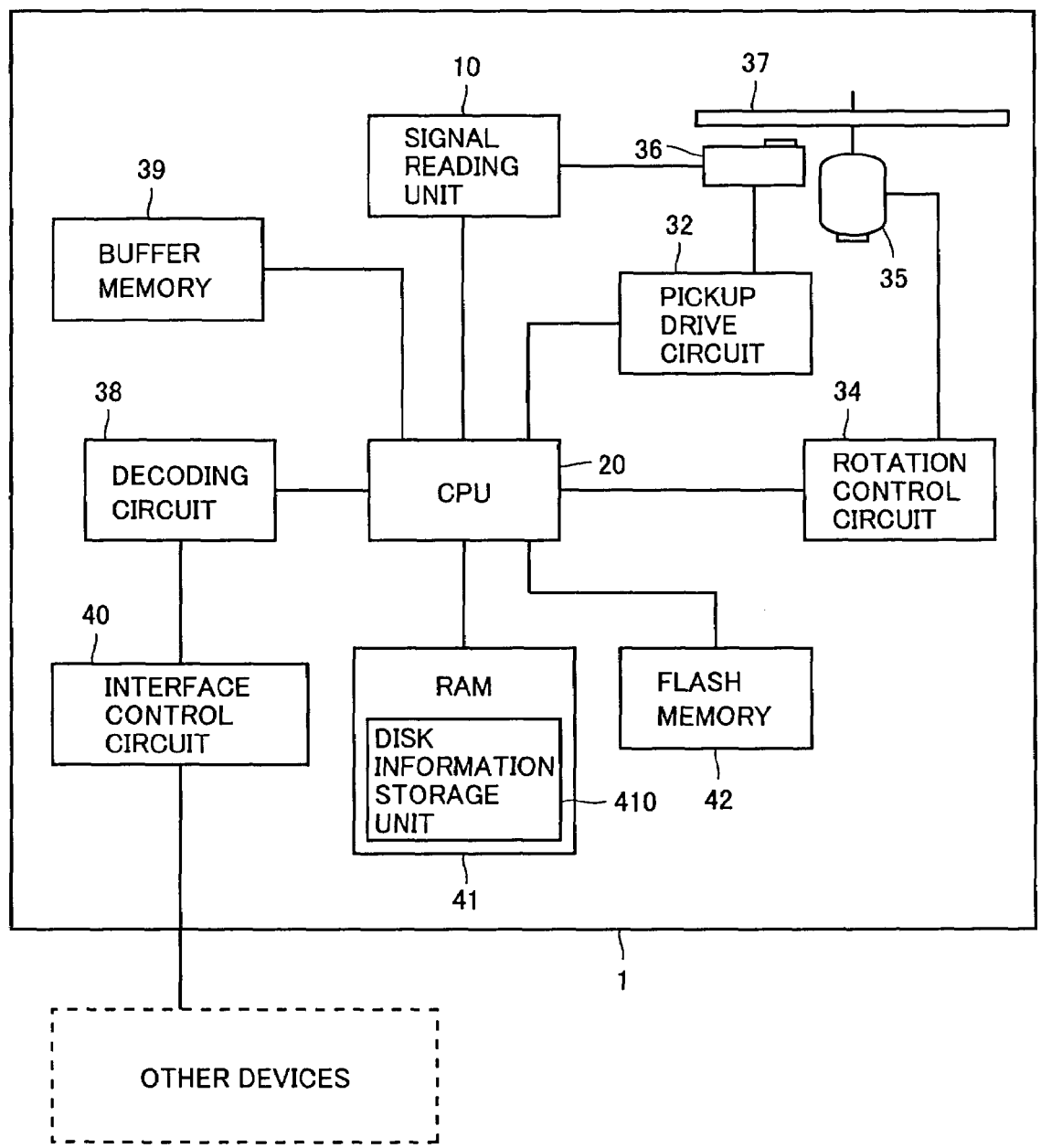
FIG. 1 is a control block diagram of a disk drive device which is an embodiment of a disk reproducing device according to the present invention.

Referring to FIG. 1, disk drive device 1 includes a CPU 20, a pickup drive circuit 32, a signal reading unit 10, a motor 35, a laser pickup 36, a decoding circuit 38, a buffer memory 39, an interface circuit 40, a RAM (Random-Access Memory) 41, and a flash memory 42. Disk drive device 1 can communicate with other external devices via interface circuit 40.

A disk 37 is placed into and held in disk drive device 1, and then CPU 20 instructs a rotation control circuit 34 to control rotations of motor 35 and thereby start a spin-up operation. CPU 20 then instructs pickup drive circuit 32 to drive laser pickup 36 so as to read data from disk 37. The data read from disk 37 is input to signal reading unit 10 to be converted into an electric signal, and the signal from signal reading unit 10 is stored in buffer memory 39. RAM 41 has, as its part, a disk information storage unit 410. CPU 20 reads from buffer memory 39 such management information as TOC (table of contents) which is included in disk data held in buffer memory 39, and stores the information in disk information storage unit 410. Signal reading unit 10 controls radiation of the laser as well as reading of information from the reflected laser light that are done by laser pickup 36.

Figure 2:
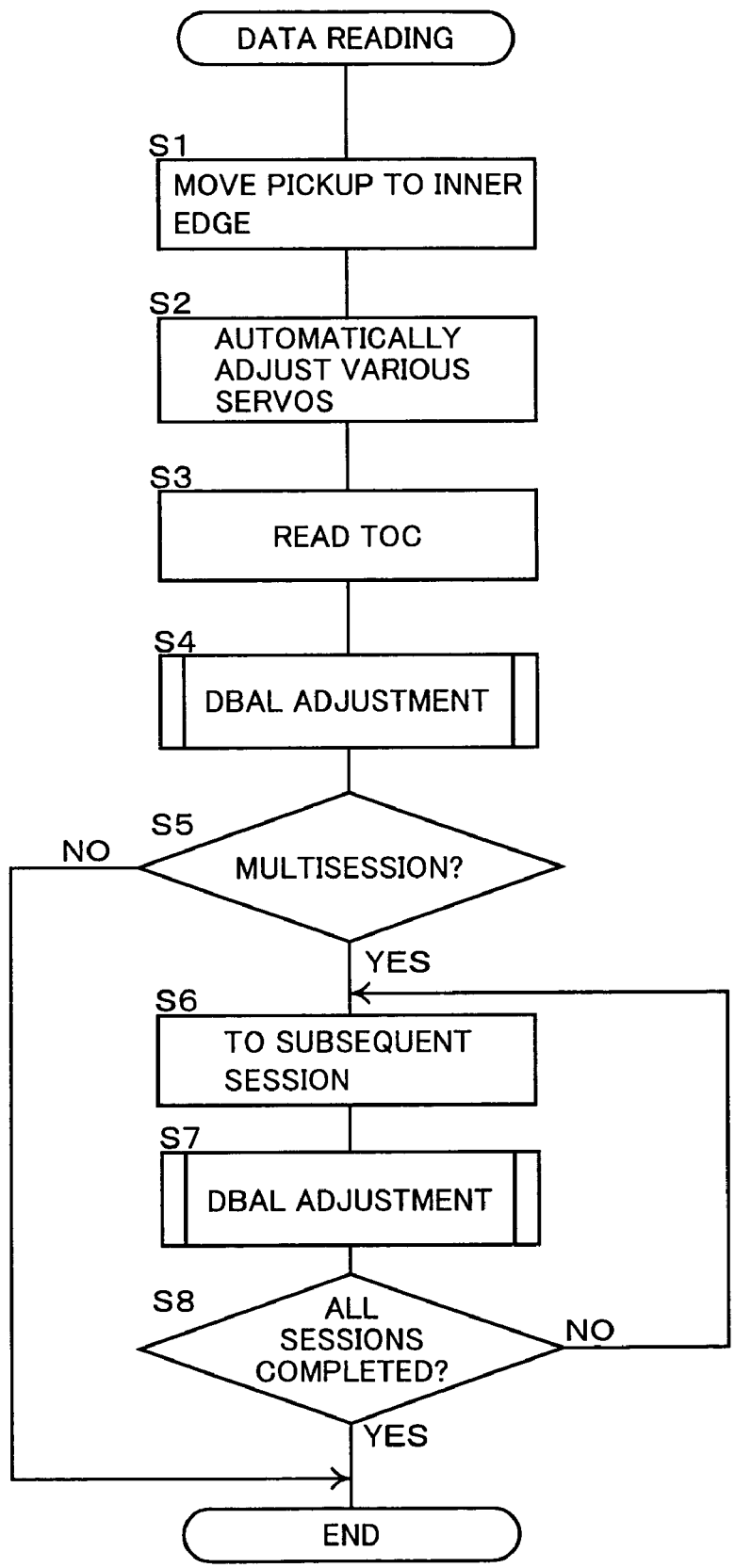
FIG. 2 is a flowchart of data reading carried out by a CPU (Central Processing Unit) in FIG. 1.

Referring to FIG. 2, details of data reading are described. Data reading is carried out, when disk 37 is placed into and held in disk drive unit 1, in order to read data from disk 37.

When data on disk 37 is to be read, CPU 20 appropriately controls pickup drive circuit 32 in step S1 (hereinafter indicated without "step") to move laser pickup 36 to the inner edge of disk 37.

In S2, CPU 20 appropriately controls pickup drive circuit 32 and signal reading unit 10 to make automatic adjustments of various servos.

In S3, CPU 20 reads TOC information from disk 37, and performs a DBAL adjustment in S4. The DBAL adjustment refers to an adjustment of the balance of a slice value of data. The DBAL adjustment is detailed hereinlater in conjunction with FIGS. 3 and 4 for example.

In S5, CPU 20 refers to the TOC information read in S3 to determine whether or not information is recorded in multisession on disk 37 which is currently held in and from which information is to be read. If CPU 20 determines that the disk is recorded with information in multisession, it advances this process to S6. If CPU 20 determines that the disk is not recorded in multisession, it ends this process.

In S6, CPU 20 proceeds from the DBAL adjustment which is previously made for a session to a DBAL adjustment for a subsequent session.

In S7, CPU 20 performs the DBAL adjustment as in S4. Then, in S8, CPU 20 determines whether or not the DBAL adjustment in S7 performed immediately before this step is done for the last session of disk 37. If so, CPU 20 ends this process as it is. If CPU 20 determines that there is any session for which a DBAL adjustment has not been made, CPU 20 returns the process to S6.

Details of the DBAL adjustment performed in S4 or S7 are now described. It is noted that CPU 20 instructs signal reading unit 10 to perform the DBAL adjustment. Then, a configuration of signal reading unit 10 is detailed below.

Figure 3:
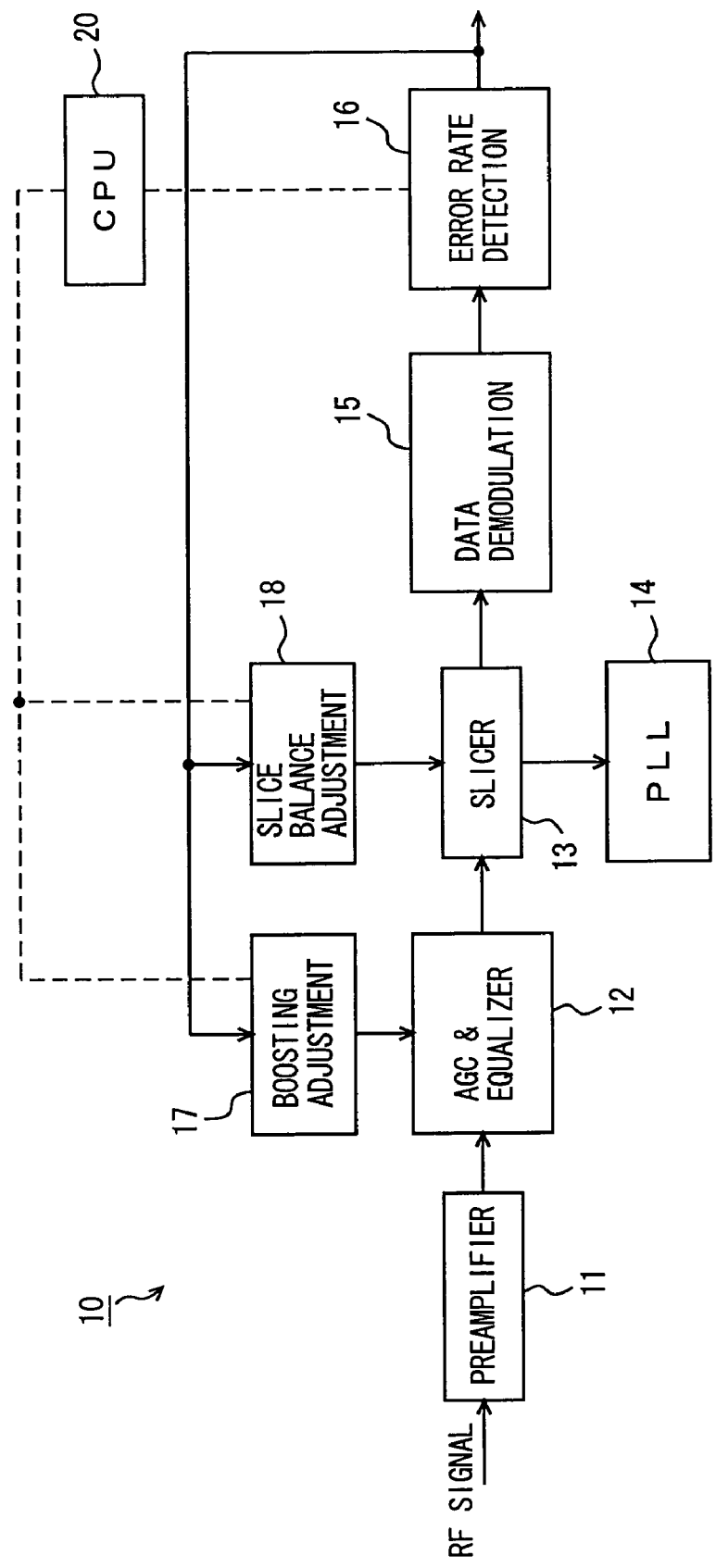
FIG. 3 is a block diagram showing a configuration of a signal reading unit in FIG. 1.

Referring to FIG. 3, signal reading unit 10 includes a preamplifier 11 amplifying a reproduction signal (RF signal) sent from laser pickup 36, an AGC (Auto Gain Control) and high-frequency emphasis filter (hereinafter referred to as "equalizer") 12 connected to preamplifier 11, the AGC absorbing a reduction in output and thereby maintaining a gain at a constant level and the high-frequency emphasis filter removing high-frequency noise of the RF signal and boosting frequency components in and around the high-frequency range of the RF signal having an extremely decreased amplitude due to intersymbol interference, a slicer 13 connected to equalizer 12 and binarizing the boosted RF signal with respect to a predetermined threshold, a PLL (Phase-Locked Loop) circuit 14 generating a clock signal, a data demodulating circuit 15 connected to slicer 13 and demodulating the binarized data, an error rate detecting circuit 16 detecting an error in the binarized signal which is demodulated by data demodulating circuit 15, a boost adjusting circuit 17 connected to error rate detecting circuit 16 and equalizer 12 and adjusting an amount of boosting by equalizer 12 so that the error rate detected by error rate detecting circuit 16 is low, a slice balance adjusting circuit 18 connected to error rate detecting circuit 16 and slicer 13 and adjusting the threshold used in the binarization by slicer 13 so that the error rate detected by error rate detecting circuit 16 is low, and a control unit (Central Processing Unit) 20 controlling error rate detecting circuit 16, boost adjusting circuit 17 and slice balance adjusting circuit 18. A reproduction signal having an error detected by error rate detecting circuit 16 is sent to a predetermined output circuit (not shown).

The DBAL adjustment performed by signal reading unit 10 is described below.

Figure 4:
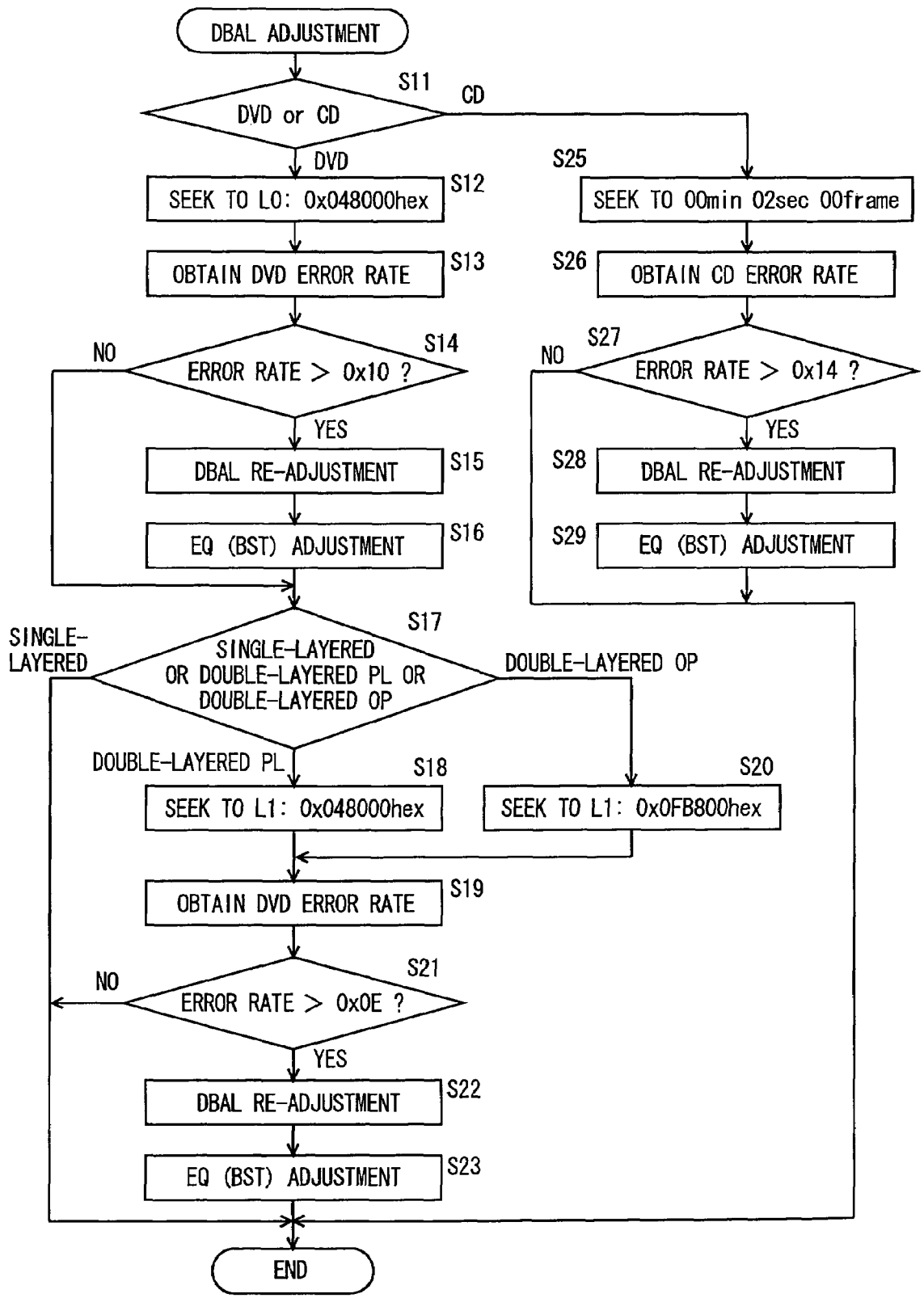
FIG. 4 is a flowchart showing a procedure of control by the CPU which controls the signal reading unit in FIG. 3.

Referring to FIG. 4, the TOC information on disk 37 is referred to in order to determine whether disk 37 which is to be reproduced is a DVD (Digital Versatile Disk) or a CD (Compact Disk) (S11). If it is determined that disk 37 is a DVD (DVD in S11), a reproduction head of laser pickup 36 is moved to address L0: 0x08000hex in order to obtain an error rate by error rate detecting circuit 16 (S12).

According to the present invention, the error rate is improved by adjusting the balance of the slicer as hereinlater described. If there is another factor, for example, a scratch on the optical disk, that makes the error rate unreliable, in other words, if the error rate at the same address is not constant due to the scratch, an optimum adjustment is impossible. In order to avoid this situation, data is acquired at a predetermined position.

Figure 5:
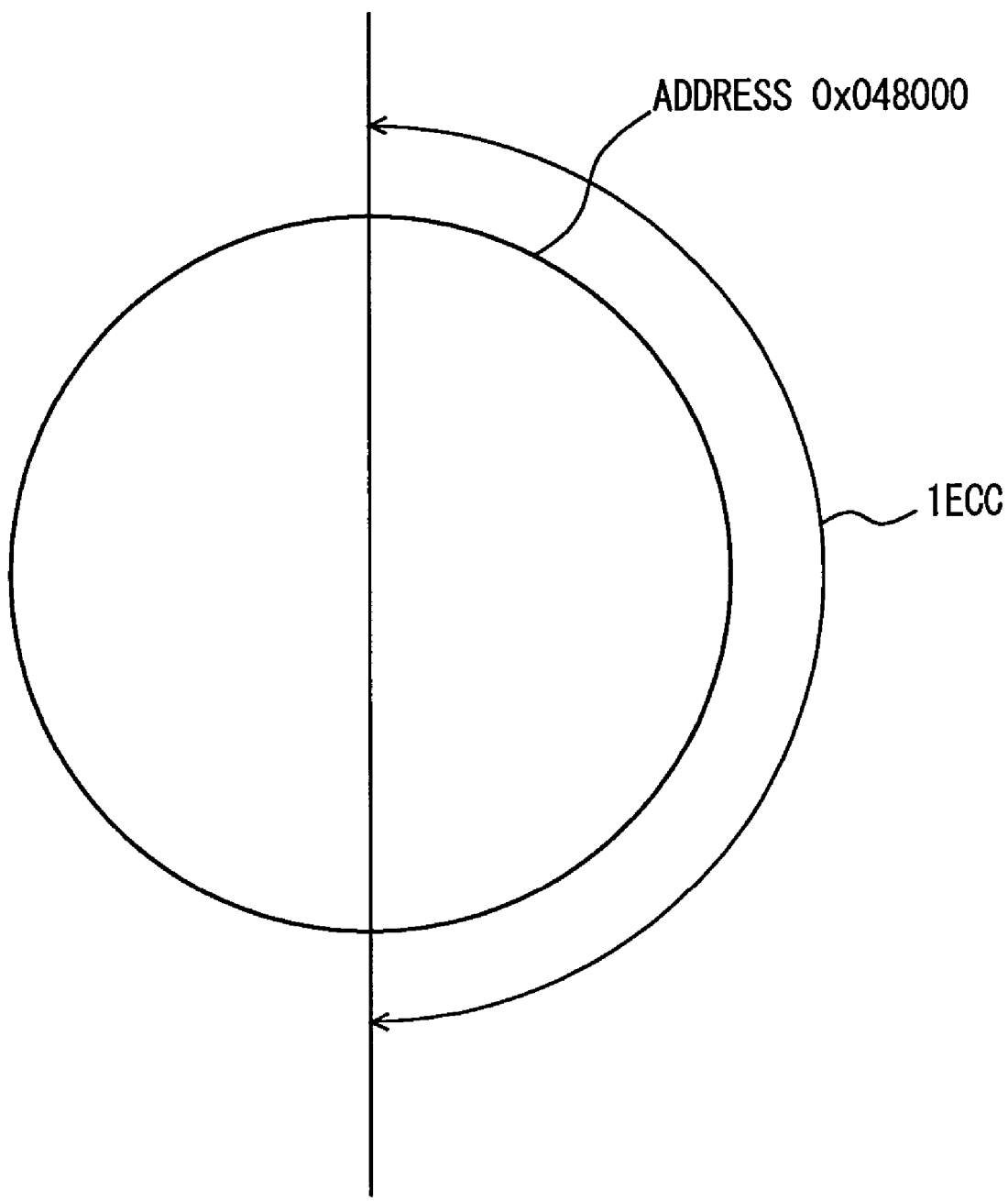
FIG. 5 illustrates a concept of an ECC (Error Collection Code) on a disk.

Referring to FIG. 5, a reason why data should be obtained at a predetermined position is described.

As the disk is read/written at CLV (Constant Linear Velocity), outer circular tracks are longer in circumference. In other words, if an outer circular track is to be read/written, it takes a longer time for the pickup to move along the perimeter of the track of the disk, as compared with the case in which an inner track is to be read/written. Therefore, it is preferable for the disk reproducing device to read tracks located as inward as possible.

The error rate is obtained on the basis of ECC (Error Correction Code). Referring to FIG. 5, approximately a half of an address 0x048000 corresponds to 1 ECC, so that 4 ECCs correspond to twice the address. In other words, if a track located inside with respect to this address is read/written, any scratch on the disk influences 3 ECCs at the worst. If a track located outside with respect to this address is read/written, it takes a long time to seek. Therefore, seek is done at 0x48000hex for obtaining data at a predetermined position described above.

It is not necessarily required to read 4 ECCs. A greater amount of data which is read provides a more accurate error rate used for comparison, while the greater amount of data to be read takes a longer time for reading accordingly.

If the amount of data to be read is too small, however, data used for comparison is not accurate.

L0 of the address used in S12 refers to Layer 1 which is a layer of the disk. If the disk is formed of two layers, a layer denoted by L1 is sought as hereinlater described.

Referring again to FIG. 4, error rate detecting circuit 16 obtains an error rate of the DVD (S13). The error rate is obtained by taking out the best value and the second best value within the range of 4 ECCs described above. Here, the error rate of the DVD is determined based on the sum of the number of corrected PI errors and the number of corrected PO errors.

Then, it is determined whether the error rate is greater than a predetermined value, for example, 0x10 (S14). If the error rate is greater than the predetermined threshold (Yes in S14), the balance of slicer 13 (threshold for binarization) is adjusted to improve the error rate (S15). Boosting by equalizer 12 is then adjusted (S16). In adjusting the boosting by equalizer 12, a signal near a 3T component of an RF signal is used, because a signal near the 3T component has a high frequency of appearance.

Further, if it is determined in S14 that the error rate is equal to or smaller than the first threshold 0x10 (NO in S14), this process proceeds to S17 for detection of an error rate of the second layer of the optical disk.

As discussed above, according to this embodiment, the slice level is adjusted based on the error rate of data of a reproduction signal. Then, if the error rate is low, only the slice level may be adjusted. The threshold of the error rate is not limited to 0x10 and may be set to an arbitrary value.

A method of determining a slice level as done in S15 is now described.

Figure 6A:
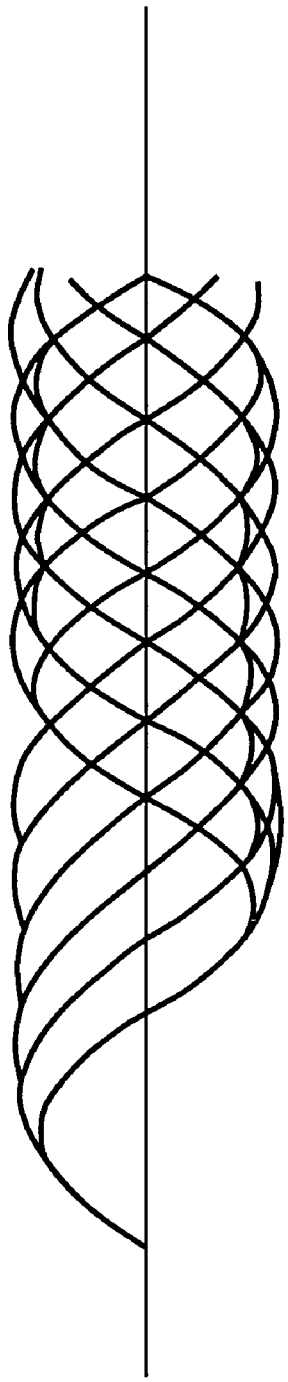
FIGS. 6A and 6B illustrate a deviation of the center of an eye pattern of an RF (Radio Frequency) signal.

FIG. 6A shows an ideal waveform of an RF signal. Specifically, 3T–14T components of an RF signal usually have the identical DC components. In other words, the RF signal is ideally symmetrical. The actual waveform, however, is the one as shown in FIG. 6B, and thus the ideal waveform cannot be achieved.

According to this embodiment, signal reading unit 10 is designed so as to allow slicer 13 to binarize the RE signal with respect to, to a certain degree, the DC components of components 3T, 4T, 5T, 6T, 7T, 8T, 9T, 10T, 11T and 14T of each RF signal. In other words, slice balance adjusting circuit 18 adjusts the slice level in consideration of the asymmetry of the RF signal while referring to the error rate. Details of processing by CPU 20 in adjusting the slice level are as follows.

If an RF signal does not have asymmetry, 3T–14T components of each signal have the same DC components and the slice level is equal to the DC components. Accordingly, each signal is normally binarized so that a substantially good error rate is obtained.

Figure 6B:
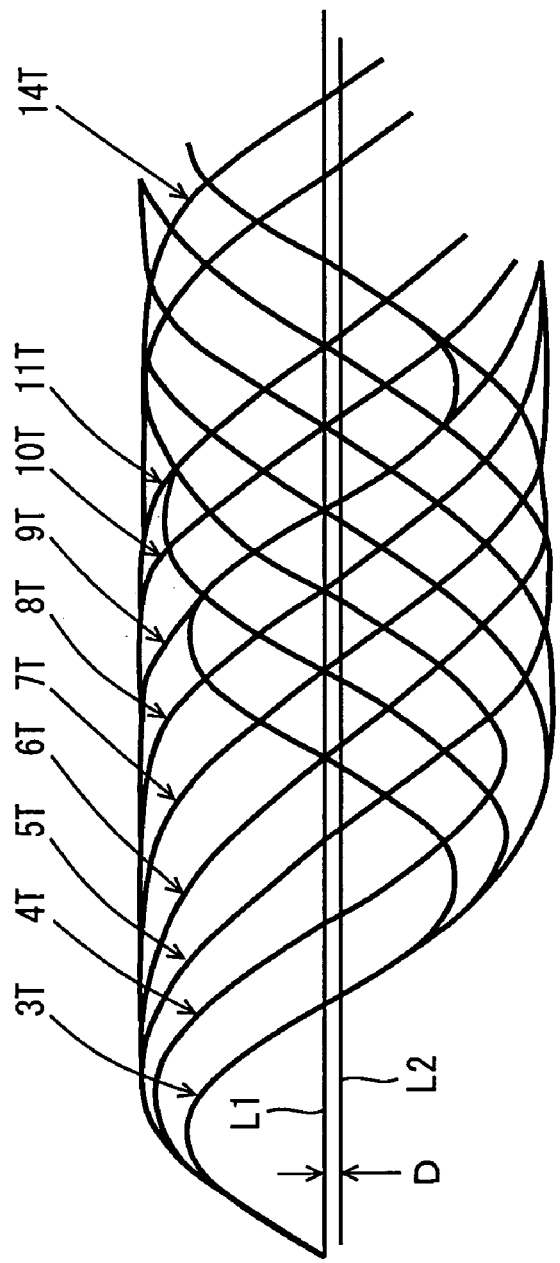

On the other hand, if an RF signal has asymmetry, the slice level, as represented by line L1 in FIG. 6B, is close to the DC components of components 3T, 4T and 5T that frequently appear. However, if the slice level is determined to be the one as indicated by line L1, components 11T and 14T that appear less frequently are not correctly detected. Since component 14T functions as a so-called "sync" component for establishing synchronization of data, the error rate is extremely deteriorated if component 14T cannot be detected.

In this embodiment, therefore, CPU 20 adds an offset D to the slice level to change the slice level to the level represented by line L2 in FIG. 6B. The slice level is thus corrected by being added with offset D. In this case, although the accuracy of detection of components 3T and 4T decreases as compared with the case in which the slice level is line L1 in FIG. 6B, component 14T can surely be detected and consequently, the error rate is improved appropriately for the disk.

Referring again to FIG. 4, in S17, it is determined whether the DVD is a single-layered disk, double-layered PL (Parallel Layer) or double-layered OP (Opposite Layer). If it is determined that the optical disk is a single-layered disk (single-layered in S17), the process is ended as it is. If it is determined that the disk is a double-layered PL (double-layered PL in S17), the reproduction head is moved to a predetermined address L1: 0x048000hex in S18, which is a position corresponding to the position in S12 of the two-layered PL. If it is determined that the disk is a double-layered OP (double-layered OP in S17), the reproduction head is moved to address L1: 0x0FB800hex in S20. After the reproduction head is moved by step S18 or S20, an error rate of the second layer of the DVD is obtained in S19. Address L1: 0x0FB800hex in S20 is an address for the double-layered OP, corresponding to address L0: 0x48000hex described in connection with S12.

After the operation in S19, it is determined in S21 whether the error rate of the second layer is greater than a predetermined threshold 0x0E. If it is determined that the error rate is greater than the predetermined threshold 0x0E (YES in S21), a balance adjustment for slicer 13 and a boosting adjustment for equalizer 12 are carried out for the second layer (S22, S23). The details of the operations executed here are the same as those in S15 and S16.

If it is determined in S21 that the error rate of the second layer is equal to or smaller than the threshold (0x0E) (NO in S21), this process is ended as it is.

If it is determined in S11 that the optical disk is a CD (CD in S11), the reproduction head is moved to an address 00min 02sec 00frame which is the innermost track of data on CD (S25). This is because an error rate of the CD can currently be obtained on the basis of 2048 frames only. However, the address to which the reproduction head is moved is not limited to the above described one for CD, and the error rate may be obtained at an arbitrary position.

In S26, an error rate of the CD is obtained. Here, the error rate of the CD is the sum of a time code converted to the number of corrected C1 error frames and a time code converted to the number of additionally corrected C2 error frames.

In S27, it is determined whether or not the obtained error rate is greater than a predetermined threshold (0x14). If it is determined that the error rate is greater than the predetermined threshold (YES in S27), a balance adjustment for slicer 13 and a boosting adjustment for equalizer 12 are carried out as done for the DVD (S28, S29). The threshold used for the operation in S27 is not limited to this value and may be an arbitrary value. In addition, the method of balance adjustment and that of boosting adjustment in S28 and S29 are similar to those in S15 and S16.

If it is determined in S27 that the error rate is equal to or less than the predetermined value (0x14) (NO in S27), the process is ended as it is.

Figure 7:
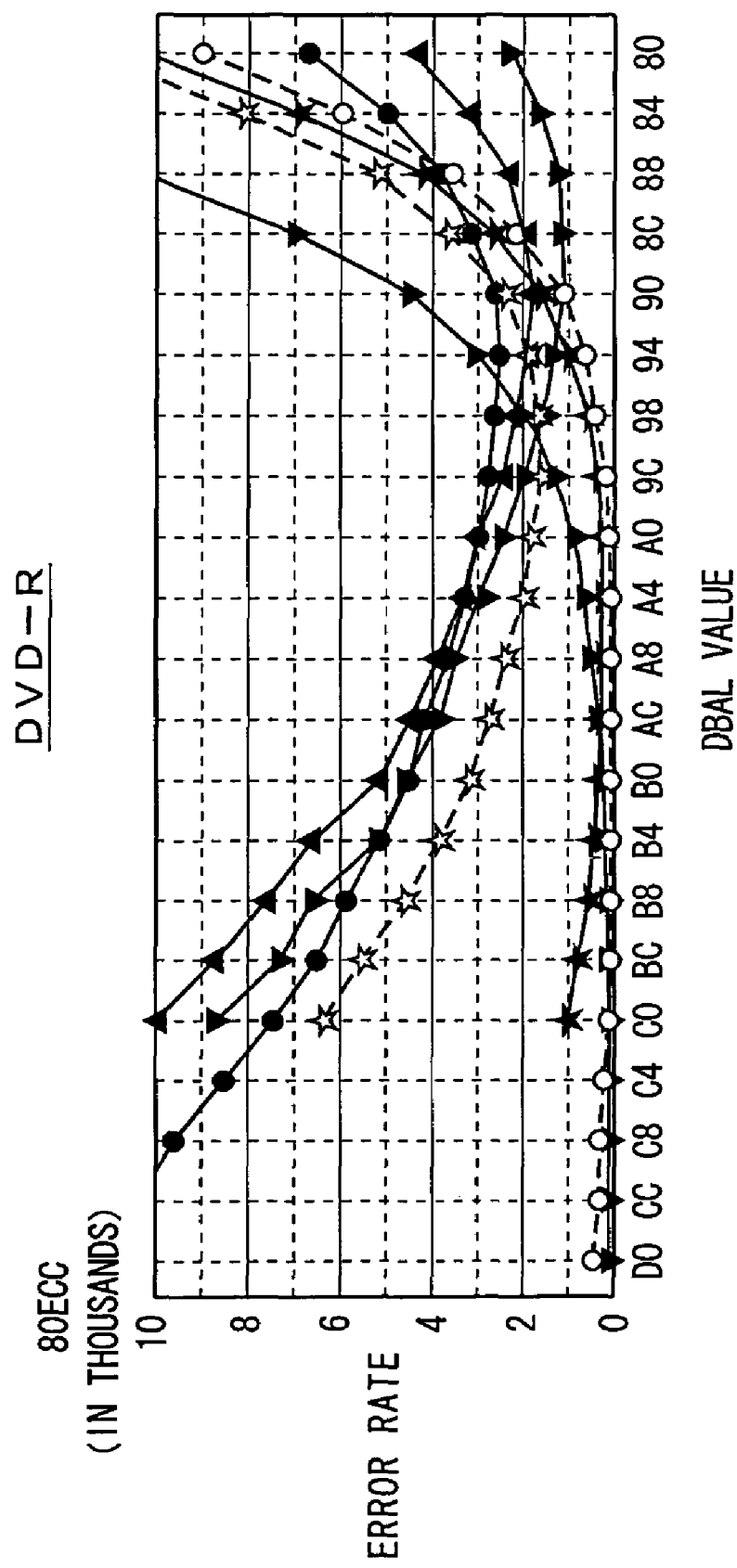
FIG. 7 shows the error rate and DBAL values of a DVD-R (Digital Versatile Disk Recordable).
Figure 8:
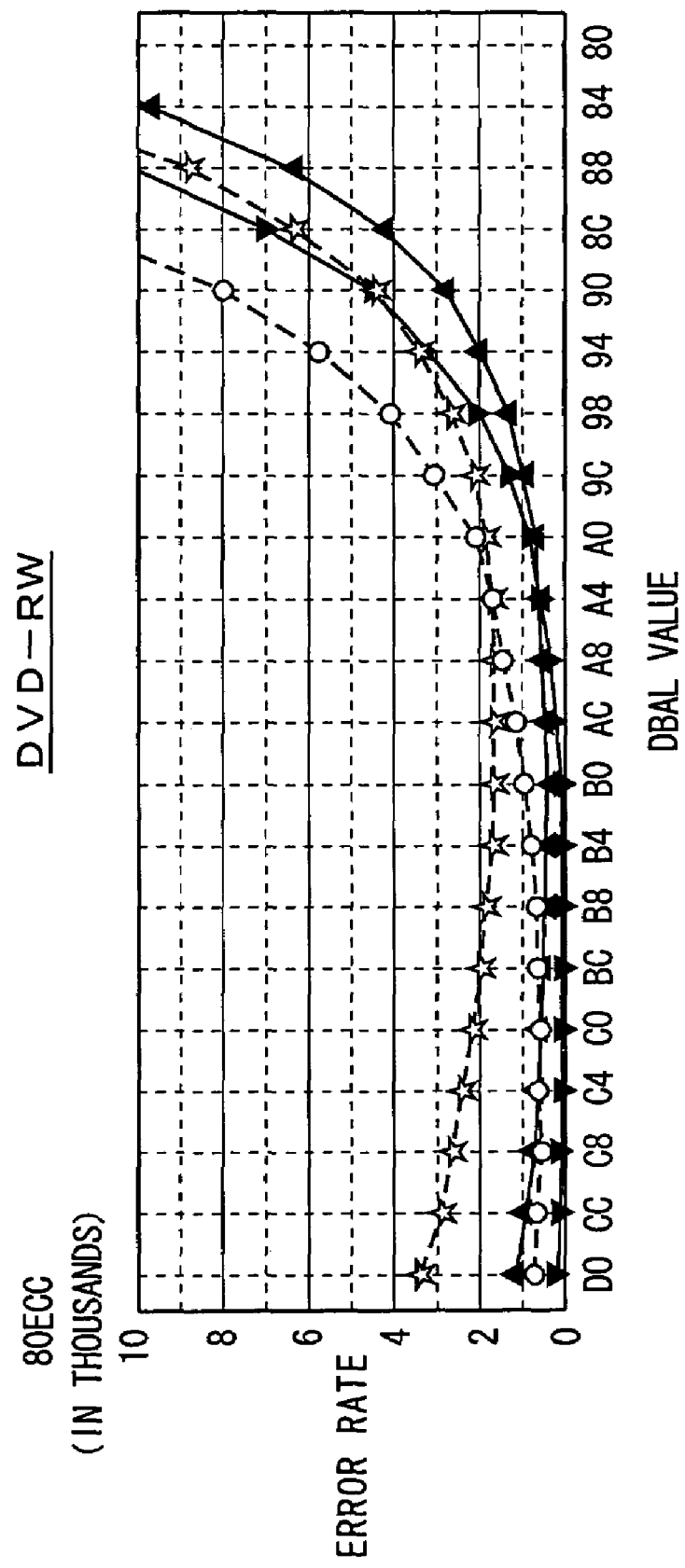
FIG. 8 shows the error rate and DBAL values of a DVD-RW (Digital Versatile Disk ReWritable).
Figure 9:
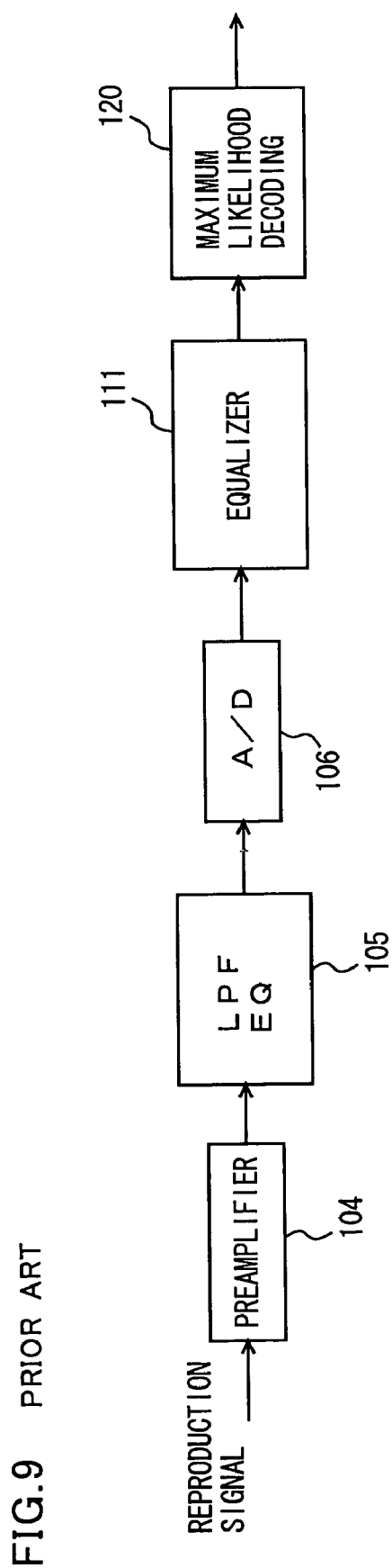
FIG. 9 illustrates a reproduction system of a conventional disk reproducing device.

FIG. 7 shows, regarding a plurality of DVD-R, a relation between the error rate and the DBAL value, and FIG. 8 shows, regarding a plurality of DVD-RW, a relation between the error rate and the DBAL value. As understood from FIGS. 7 and 8, even if the disks are of the same type, quality and symmetry/asymmetry of the RF signal differ depending on the disks. Thus, it is advantageous to determine the balance value for slicer 13 for each of the disks in this embodiment.

Although the present invention determines the error rate of the DVD based on the sum of the number of corrected PI errors and the number of corrected PO errors and the error rate of the CD is determined based on the sum of the number of corrected C1 error frames and the number of additionally corrected C2 error frames, these error rates are not limited to the above-mentioned ones. For each of the DVD and the CD, the error rate may be determined based not on the sum but on one of the numbers, or may be determined based on any value except for them.

In the foregoing description, the adjustment of the slice level and the adjustment of the boosting for the double-layered DVD and the CD are performed successively. However, as done for the single-layered DVD, only one of the adjustment of the slice level and the adjustment of the boosting may be performed if the error rate is low.

According to this embodiment described above, the balance of the slice value of data is adjusted for each session. Accordingly, the error rate can be improved even if information is written on one disk by means of a plurality of writing devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk reproducing device comprising:
a high-frequency emphasis filter to which a disk reproduction signal is input;
a binarizing unit connected to said high-frequency emphasis filter and binarizing said disk reproduction signal;
an error detecting unit connected to said binarizing unit and detecting an error in the binarized disk reproduction signal;
a threshold adjusting unit connected to said error detecting unit and said binarizing unit and adjusting a threshold used for the binarization by said binarizing unit;
a determining unit determining whether or not a disk to be reproduced is recorded with information in multisession; and
a control unit correcting the threshold adjusted by said threshold adjusting unit based on the degree of asymmetry of said disk reproduction signal;
wherein said binarizing unit, said error detecting unit, said threshold adjusting unit, and said control unit are configured to operate for each session of the disk to be reproduced when said determining unit determines that the disk to be reproduced is recorded with information in multisession.

2. A disk reproducing device comprising:
a high-frequency emphasis filter to which a disk reproduction signal is input;
a binarizing unit connected to said high-frequency emphasis filter and binarizing said disk reproduction signal;
an error detecting unit connected to said binarizing unit and detecting an error in the binarized disk reproduction signal;
a threshold adjusting unit connected to said error detecting unit and said binarizing unit and adjusting a threshold used for the binarization by said binarizing unit; and
a control unit correcting the threshold adjusted by said threshold adjusting unit based on the degree of asymmetry of said disk reproduction signal; wherein
said binarizing unit, said error detecting unit, said threshold adjusting unit, and said control unit are configured to operate for each session of the disk to be reproduced when recorded with information in multisession.

3. The disk reproducing device according to claim 2, further comprising a determining unit determining whether or not the disk to be reproduced is recorded with information in multisession,
wherein said binarizing unit, said error detecting unit, said threshold adjusting unit, and said control unit are configured to operate for each session of the disk to be reproduced when said determining unit determines that the disk to be reproduced is recorded with information in multisession.

4. The disk reproducing device according to claim 1, wherein when said determining unit determines that the disk to be reproduced is recorded with information in multisession, a slice value is adjusted for each session of the disk by the threshold adjusting unit.

5. The disk reproducing device according to claim 3, wherein when said determining unit determines that the disk to be reproduced is recorded with information in multisession, a slice value is adjusted for each session of the disk by the threshold adjusting unit.

6. The disk reproducing device according to claim 1, wherein the predetermined threshold is adjusted by the threshold adjusting unit dependent on whether the error rate of the binarized disk reproduction signal is greater than a predetermined maximum value.

7. The disk reproducing device according to claim 3, wherein the predetermined threshold is adjusted by the threshold adjusting unit dependent on whether the error rate of the binarized disk reproduction signal is greater than a predetermined maximum value.

8. A method for adjusting a slice value of a disk in a disk reproducing device, comprising:

determining whether or not a disk to be reproduced is recorded with information in multisession;
if the disk is recorded with information in multisession, for each session of the disk:
  inputting a disk reproduction signal;
  binarizing the disk reproduction signal dependent on a predetermined threshold;
  detecting an error rate in the binarized disk reproduction signal;
  adjusting the predetermined threshold used for the binarizing when the error rate of the binarized disk reproduction signal is greater than a predetermined maximum value; and
  correcting the predetermined threshold based on the degree of asymmetry of said disk reproduction signal.

* * * * *